US010181268B2

(12) United States Patent
Gupta et al.

(10) Patent No.: US 10,181,268 B2
(45) Date of Patent: Jan. 15, 2019

(54) SYSTEM AND METHOD FOR TOY VISUAL PROGRAMMING

(71) Applicant: Play-i, Inc., San Mateo, CA (US)

(72) Inventors: Saurabh Gupta, Sunnyvale, CA (US);
Vikas Gupta, Palo Alto, CA (US);
Orion Elenzil, San Mateo, CA (US);
Leisen Huang, San Mateo, CA (US)

(73) Assignee: Play-i, Inc., San Mateo, CA (US)

( * ) Notice: Subject to any disclaimer, the term of this patent is extended or adjusted under 35 U.S.C. 154(b) by 85 days.

(21) Appl. No.: 15/582,924

(22) Filed: May 1, 2017

(65) Prior Publication Data

US 2017/0236446 A1    Aug. 17, 2017

Related U.S. Application Data

(63) Continuation of application No. 15/260,865, filed on Sep. 9, 2016, now Pat. No. 9,672,756, which is a continuation-in-part of application No. 14/737,347, filed on Jun. 11, 2015, now Pat. No. 9,498,882.

(60) Provisional application No. 62/219,325, filed on Sep. 16, 2015, provisional application No. 62/011,478, filed on Jun. 12, 2014, provisional application No. 62/015,969, filed on Jun. 23, 2014.

(51) Int. Cl.
*G06F 19/00* (2018.01)
*G09B 19/00* (2006.01)
*G09B 5/02* (2006.01)
*A63H 30/04* (2006.01)

(52) U.S. Cl.
CPC ......... *G09B 19/0053* (2013.01); *A63H 30/04* (2013.01); *G09B 5/02* (2013.01); *G05B 2219/36025* (2013.01); *Y10S 901/04* (2013.01)

(58) Field of Classification Search
None
See application file for complete search history.

(56) References Cited

U.S. PATENT DOCUMENTS

| D290,032 S | 5/1987 | Horiuchi |
| 5,638,522 A | 6/1997 | Dunsmuir et al. |
| D471,243 S | 3/2003 | Cioffi et al. |
| 6,604,021 B2 | 8/2003 | Imai et al. |
| 6,668,211 B1 | 12/2003 | Fujita et al. |
| 6,895,305 B2 | 5/2005 | Lathan et al. |
| D559,288 S | 1/2008 | Matsuda |
| D624,610 S | 9/2010 | Wu et al. |
| D639,353 S | 6/2011 | Stibolt |
| D641,805 S | 7/2011 | Kichijo et al. |
| D650,866 S | 12/2011 | Clahsen |
| D672,402 S | 12/2012 | Macadam |
| D688,328 S | 8/2013 | Holm |
| D689,957 S | 9/2013 | Jensen |

(Continued)

FOREIGN PATENT DOCUMENTS

WO    103525    8/2012

*Primary Examiner* — Bhavesh V Amin
(74) *Attorney, Agent, or Firm* — Jeffrey Schox

(57) ABSTRACT

A method for programmatic robot control including, at a user device: displaying a set of icons and receiving a program for a robot, wherein receiving a program for a robot includes receiving a selection of a state icon associated with a state; associating a transition with the state; and creating a relationship between the transition and an event. The method functions to provide a user with an environment for creating a program to control the robot, and can additionally function to control the robot.

20 Claims, 10 Drawing Sheets

(56) References Cited

U.S. PATENT DOCUMENTS

| | | |
|---|---|---|
| D701,923 S | 4/2014 | Jensen |
| 8,812,157 B2 | 8/2014 | Morioka et al. |
| D718,394 S | 11/2014 | Weiss |
| 8,886,359 B2 | 11/2014 | Inaba et al. |
| 9,079,305 B2 | 7/2015 | Williamson et al. |
| D748,204 S | 1/2016 | Simonds et al. |
| 9,446,510 B2 | 9/2016 | Vu et al. |
| 9,459,838 B2 | 10/2016 | Lam et al. |
| 2004/0186623 A1 | 9/2004 | Dooley et al. |
| 2011/0276058 A1 | 11/2011 | Choi et al. |
| 2013/0324004 A1 | 12/2013 | Schwartz |
| 2017/0291295 A1 | 10/2017 | Gupta et al. |

SYSTEM AND METHOD FOR TOY VISUAL PROGRAMMING

CROSS-REFERENCE TO RELATED APPLICATIONS

This application is a continuation of U.S. application Ser. No. 15/260,865, filed 9 Sep. 2016, which is a continuation-in-part of U.S. application Ser. No. 14/737,347 filed 11 Jun. 2015, which claims priority to U.S. Provisional Application No. 62/011,478 filed on 12 Jun. 2014 and U.S. Provisional Application No. 62/015,969 filed on 23 Jun. 2014 which are incorporated in their entireties by this reference.

This application is a continuation of U.S. application Ser. No. 15/260,865, filed 9 Sep. 2016, which claims the benefit of U.S. Provisional Application Ser. No. 62/219,325 filed on 16 Sep. 2015, which are incorporated in their entireties by this reference.

TECHNICAL FIELD

This invention relates generally to the programming education field, and more specifically to a new and useful system and method for programming robotic toys in the programming education field.

BACKGROUND

There has been a recent emphasis in the education field to teach children and young people programming. Many view programming as a useful skill in our computerized world, and there are several core concepts that could be introduced at an early stage. However, the complexity around programming makes it a challenging topic to introduce to children. The concepts can be viewed by children as too difficult or not interesting enough. Thus, there is a need in the programming education field to create a new and useful system and method for reinforcing programming education through robotic feedback. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
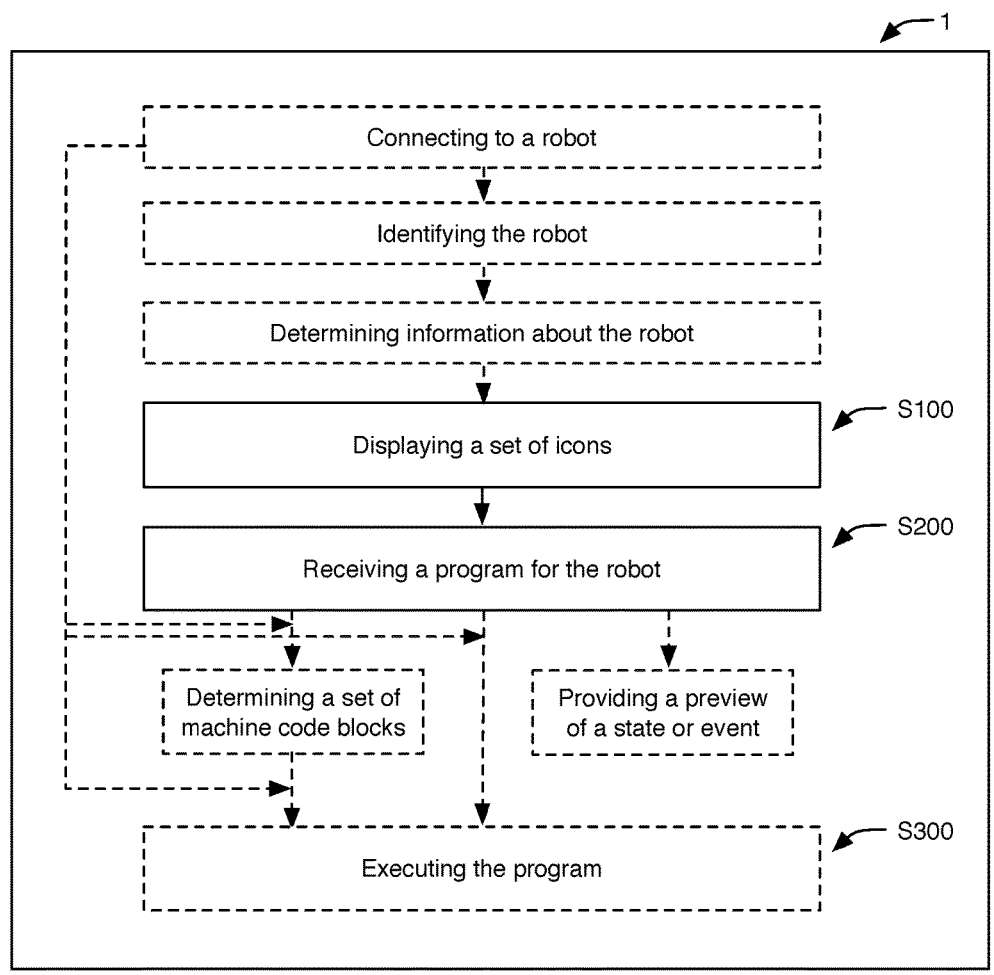
FIG. 1 is a flowchart representation of the method.

As shown in FIG. 1, the method for programmatic robot control 1 includes, at a user dev: displaying a set of icons S100; and receiving a program for a robot S200, including receiving a selection of a state icon associated with a state S210, associating a transition with the state S220, and creating a relationship between the transition and an event S230. The method 1 functions to provide a user with an environment for creating a program to control the robot, and can additionally function to control the robot.

2. Benefits

The method 1 can confer several benefits. A programming environment that is mostly or entirely visual can be simpler and easier to use than traditional text-based programming. Furthermore, strong graphical associations between programming elements (e.g., icons) and program execution elements (e.g., robot behaviors, events) can be easier for children to understand than text elements or abstract icons. Intuitive touch interfaces, using aspects such as the drag-and-drop paradigm, also contribute to the ease-of-use of a programming environment. Restrictions on the use or availability of some programming structures and concepts can serve to simplify the programming process. Restrictions can be used to ensure that only one part of a program executes at any given time (e.g., the robot is only in a single state at any given time), which can prevent potential confusion arising from concurrent execution of multiple portions of a program. For example, program execution can begin from a single unique start state, and event selection can be restricted to prevent the creation of branch points that could lead to entering two states concurrently.

Cooperative execution by a robot and user device (e.g., wherein the robot executes the states and the user device determines whether events have occurred) can confer several additional benefits. First, this can remove program compilation and some aspects of program execution from the robot to the user device, which simplifies the construction of the robot and lowers the robot manufacturing cost. This can also enable older toys, previously manufactured without user-accessible programming capabilities, to be user-programmable by simply adding a chip that includes basic computing and/or communication functionalities (e.g., WiFi chip) to the toy. Second, this can allow the user to debug the program in real-time, since the robot will not execute the next state until after the event occurs (since the robot has not received the instruction for the next state). Third, this allows for any sort of programming method and/or language to be used to program the robot, because the robot does not need to compile the program; this allows a user to progress through various programming methods of varying complexities while using the same robot. Fourth, this allows the robot to accommodate multiple state types, from single-instance states controlling a single output to states that extend over a period of time and control multiple outputs. This benefit is conferred because the user device creates (e.g., compiles) the machine code for the simple or complex state, and the robot simply acts according to the instruction.

3. System

Figure 2:
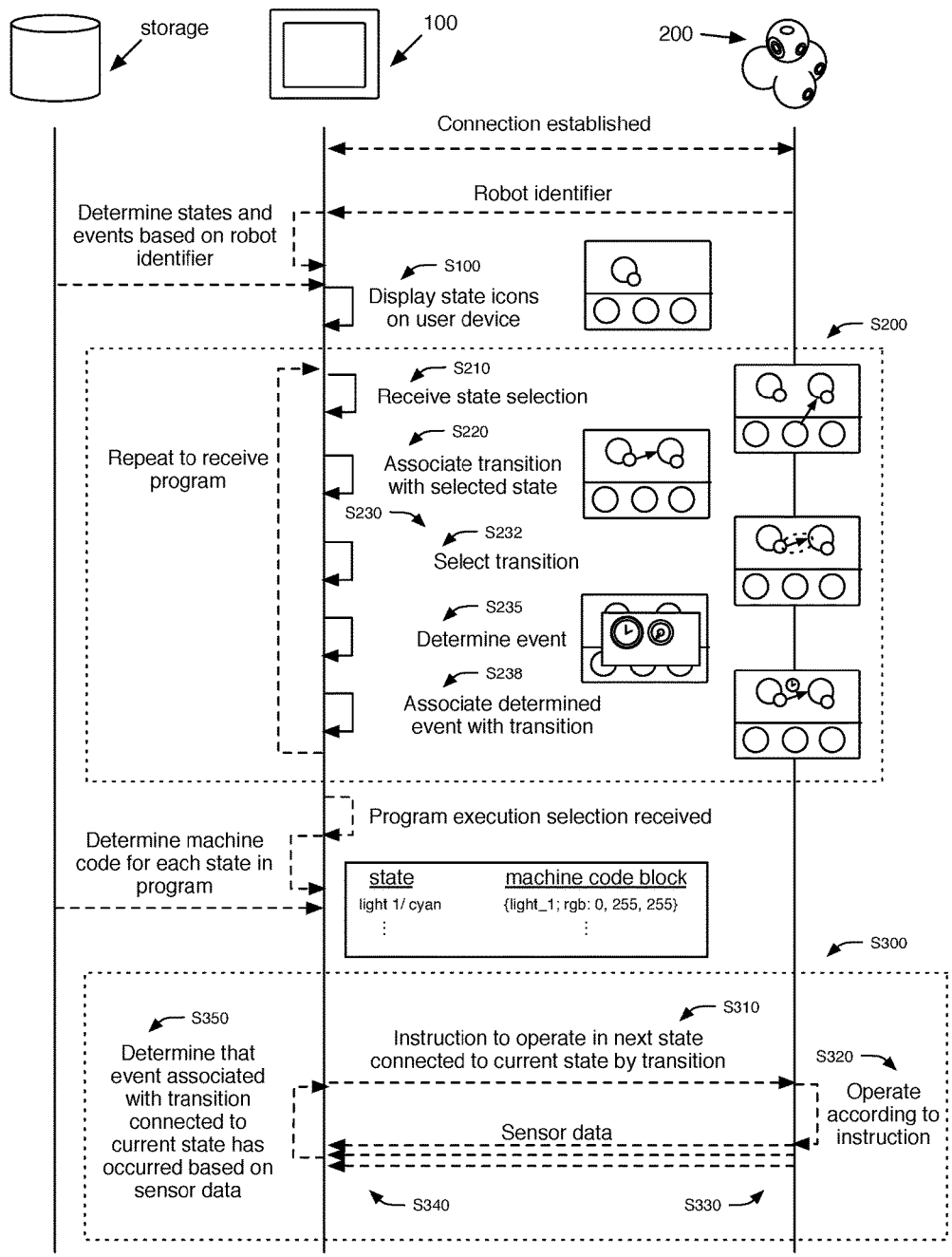
FIG. 2 is a schematic representation of a first variation of the method.

As shown in FIG. 2, the method 1 is preferably performed by a user device 100, more preferably a mobile device (e.g., tablet, smartphone, laptop, etc.), but can alternatively be performed by a desktop, server system, or any other suitable computing device. The programming is preferably performed with the device display (and/or other output, such as a speaker, haptic feedback mechanism, etc.) and a device input (e.g., touchscreen or touchscreen interface, mouse, etc.), wherein the device display or outputs can present the specified method outputs (e.g., state icons, event icons, transition icons, controls, etc.) and the device inputs can receive the inputs (e.g., state selections, event selections, transition endpoint selections, parameter value selections, etc.); and the processing, receipt, and sending is preferably performed by a device processing unit (e.g., processing system, CPU, GPU, microprocessor, etc.) and/or communication module (e.g., WiFi radio, Bluetooth radio, BLE radio, wired connection, etc.). However, portions of the method 1 can be performed by any other suitable portion of the device, remote device (e.g., second user device, remote server system, etc.), or any other suitable computing system. The user device is preferably remote (e.g., separate from) the toy robot, but can alternatively be collocated with, connected to, or otherwise associated with the toy robot.

The method 1 can additionally be performed in conjunction with a robot 200, preferably an electronic toy, but alternatively any other suitable robotic system. The robot 200 can include one or more active outputs, such as lights, speakers, and motorized components (e.g., motorized arms, legs, wheels, ears, eyes, etc.), but can alternatively be substantially passive (e.g., manually actuated), static, or have any other suitable set of outputs. The robot 200 can include one or more inputs (e.g., sensors, buttons, etc.). Examples of inputs include light sensors (e.g., ambient light sensors, cameras, LIDAR systems, etc.), audio sensors (e.g., microphones), motor encoders, proximity sensors, orientation sensors (e.g., accelerometers, gyroscopes, etc.), location sensors (e.g., trilateration systems, GPS systems, etc.), switches, or any other suitable set of sensors.

4. Method

Block S100 recites displaying a set of icons. Block S100 preferably functions to display icons available for use in a program, but alternatively can function to display any icons related to creating a program, or to display any suitable icons.

The icons can be associated with aspects relating to the toy robot, or can be associated with aspects relating to the user device, to other robots, to other user devices, to program design, control, or execution, or to any other suitable entities or concepts. In some embodiments, some icons can be associated with states the toy robot is capable of operating in, while other icons can be associated with events the toy robot is capable of undergoing. The states, events, and associated icons are preferably pre-determined (e.g., by a toy entity, such as a toy manufacturer), but can alternatively be user-defined, automatically generated (e.g., based on past states or events generated by a given user population), or otherwise determined.

States can be associated with one or more toy robot subsystems (e.g., head, light array, wheels), or can be associated with the entire toy robot, or can be otherwise suitably related to toy robot operation. Each state preferably represents a fixed set of output parameter values (e.g., a specific set of lights to emit light at a specific color and intensity), but can alternatively represent a variable output (e.g., wherein the variable values can be dynamically determined based on connected states and events), represent an input, or represent any other suitable robot parameter. Examples of states include light colors, light intensity, specific light control, robot component movement (e.g., forward, backward, to the side, head movement, tail movement, arm movement, individual wheel control, etc.), playing a sound, robot data capture (e.g., sound, image, or video capture), or include any other value for any other suitable output and/or input variable. In a specific example, a state can be associated with two independent subsystems, such as turning on a green light while tilting the robot head upward. Additionally or alternatively, a state can be a sub-routine (e.g., function) and/or sub-state-machine (e.g., a second state machine within a state machine). A sub-routine can include a progressing through a sequence of programmatic elements, or can be otherwise suitably defined. A sub-state-machine can include states, transitions, and events, and can be similar to or different from the state machine in which it is embedded. However, sub-routines and/or sub-state-machines can be any other suitable program elements.

Events can be associated with one or more toy robot input systems (e.g., sensors or input devices), associated with other input systems, associated with time intervals, associated with progress through actions associated with a state, or associated with other suitable conditions. Each event preferably represents a fixed set of input variable values (e.g., a specific input received at a specific location relative to the robot, a specific wavelength of sound, a specific input threshold value being exceeded, a sustained input received for more than a threshold period of time, etc.), but can alternatively represent a variable input (e.g., a range of inputs, etc.), represent an output, represent any other suitable robot parameter, or represent any other suitable parameter. In a specific example, examples of events can include timers, robot tilt (e.g., relative to a gravity vector, relative to a previous robot orientation, etc.), robot acceleration (e.g., along or against a gravity vector, along a robot axis, along a vector at an angle relative to a gravity vector and/or robot axis, etc.), button depression, button release, sound detection, sound direction detection, secondary robot direction detection (e.g., based on the beacon strength of a secondary robot, based on visual system feedback, etc.), secondary robot proximity detection, obstruction detection (e.g., based on motor feedback or visual systems), overcoming the obstruction, robot component actuation (e.g., head turning, tail wagging, wheels turning, etc.), component movement cessation, robot vibration or shaking, or include any other suitable event.

Each icon can illustrate the toy robot in the state (e.g., respective associated state) or undergoing the event (e.g., respective associated event); can include any other suitable illustration or representation representative of the respective state(s) or event(s) associated with the icon (e.g., animation, text, etc.); be otherwise graphically associated with the state(s) or event(s); or otherwise suitably associated with a program element (e.g., state, event, etc.). In some embodiments, a state icon can illustrate a toy robot subsystem operating in a state associated with that subsystem, and an event icon can illustrate a toy robot input system undergoing an event associated with that input system.

The icons are preferably displayed as a set of unconnected icons on a virtual tray or in a virtual menu, but can alternately be displayed as a set of unconnected icons, be displayed as a set of partially- or fully-connected icons, or displayed in any other suitable manner. The icons can be displayed simultaneously, or can be displayed at separate times (e.g., serially), in groups, individually, or their display can have any other suitable temporal relation. The icons can be ungrouped, be grouped by type (e.g., state icons or event icons), be grouped by category represented (e.g., icons representing states or events relating to light, sound, motion, time, or proximity), or be otherwise suitably grouped. The icons can be displayed in response to device connection to the robot, in response to a robot client (e.g., native application, web application, etc.) being launched on the device, or be displayed in response to occurrence of any other suitable display event.

Receiving a program for the robot S200 functions to receive programming for the robot. The program can include a program including a set of programming elements, or include any other suitable set of programming components. The program is preferably received from a user, but can alternatively be received from storage (e.g., user device storage, remote storage, the robot, etc.), or be received from any other suitable source. The program can be received using a touchscreen interface, but can alternately be received using a mouse interface, a keyboard interface, a voice command interface, a visual interface, or any other suitable interface.

The program is preferably received through a drag-and-drop paradigm (e.g., drag-and-drop selection method), but can alternatively be received through an add-and-label paradigm (e.g., wherein the system can automatically determine the output or event associated with the added label, or receive the definition from the user), or be received through any other suitable program construction paradigm. The drag-and-drop paradigm can include: detecting a continuous selection beginning at a first location and ending at a second location; identifying a first icon located at or near the first location, wherein the first icon is associated with a first program element (e.g., program state, program transition, program event); and associating the program element with the second location, with a second icon located at or near the second location, or with a second program element associated with the second icon. The continuous selection can be a continuous touch (e.g., a finger held on a touchscreen interface), but can alternately be a held mouse button, a held keyboard key, or any other suitable continuous selection.

The program is preferably represented as (and/or defines) a finite-state machine, but can optionally be represented as (and/or define) a pushdown automaton, a stack automaton, Turing machine, or any other suitable virtual machine. The finite-state machine can include program states connected by program transitions, wherein each transition is directed from a respective first state to a respective second state and is associated with one or more program events. A transition preferably indicates that, when the program is in the first state associated with the transition, the program advances to the second state associated with the transition in response to the occurrence of one or more of the associated events. However, the program can alternately be represented in any other suitable manner.

The program is preferably represented graphically, but can additionally or alternatively be represented textually (e.g., by a table listing the first and second states for each transition), or be otherwise suitably represented. A graphical representation of the program can include a set of state icons connected by a set of graphical representations of transitions, wherein the graphical representations of the transitions are associated with event icons (e.g., wherein the event icons are proximal the transitions; wherein the event icons overlay a portion of the transitions, etc.). However, the graphical representation of the program can additionally or alternatively include other graphical representations of the program states, transitions, or events, include text representations of the program states, transitions, or events, linked by graphical elements or arranged in a graphical representation of the program structure, or be otherwise constructed. The state icons and event icons in the graphical representation of the program can be identical to some or all of the icons displayed in Block S100, but alternatively can be similar to some or all of the icons displayed in Block S100, can be otherwise associated with some or all of the icons displayed in Block S100, or can be any other suitable icons. The graphical representation of the program can be a state diagram (preferably a directed graph, but alternately a statechart or any other suitable state diagram), but alternately can be any other suitable graphical representation. The graphical representations of the program states and program events can be circular icons, but can alternately be any suitable shape or other graphical representation. The graphical representations of the program transitions can be single arcs and line segments, but alternately can include multiple arcs or line segments or other paths, or can include other shapes, or be any other suitable graphical representation. For example, graphically representing the program can include representing the program as a set of connected icons on a virtual stage rendered on the display of the user device, separate from the state options that can be visually represented as a set of unconnected icons on a virtual tray in Block S100 (example shown in sequence in FIGS. 5-12).

Receiving a selection of a state icon associated with a state S210 functions to receive an indication of the state. The state icon is preferably one of the set of icons displayed in Block S100, but can alternatively be any suitable icon. The state icon is preferably representative of the state, and more preferably includes an illustration of the robot operating in the state, but alternatively can be any icon associated with a state and displayed in Block S100, or any other suitable icon. In response to receiving the selection of the state icon, the state (e.g., code associated with the icon) is preferably added to the program, but can alternately be otherwise associated with the program. In some embodiments, Block S210 can be repeated to receive indications of additional states (e.g., second state, third state, etc.). Each of the states indicated can be different from each other, identical to each other, or identical to some and different from others. Different states can be indicated by different state icons, the same state icon, or otherwise represented.

In embodiments in which the program is represented graphically, a representation of the state (preferably the state icon, but alternately any other suitable representation) can be added to the graphical representation of the program (e.g., by allowing a user to select state icons by dragging the state icons from the tray into the stage; by double tapping the state icon; etc.). The placement of the state representation can be specified by the user (e.g., by dropping the state representation at a desired location when using the drag-and-drop paradigm; by tapping the destination location; etc.), or can be determined automatically, possibly based on the placement of other elements of the graphical representation of the program, or can otherwise be suitably determined. In one embodiment, the desired location of the state representation is specified by the user, and the exact location of the state representation is determined such that it is close to the desired location and such that the elements of the graphical representation of the program remain easily viewed (e.g., overlap less than a threshold amount, such as 0% or 10%). In variations of the embodiment, the location of the state representation can be determined such that the state representation is a predetermined distance from other elements of the graphical representation of the program (e.g., coincident, at least 2 mm apart, apart by at least a distance equal to 10% of the representation's width) or overlaps other elements of the graphical representation of the program by no more than a predetermined amount (e.g., 20% overlap, 1 mm overlap). In further variations of the embodiment, the position and/or appearance properties (e.g., size, shape, transparency) of one or more of the other elements of the graphical representation of the program can be altered in response to the addition of the representation of the state, in order to satisfy a minimum separation or maximum overlap constraint, or to otherwise maintain easily viewed elements of the graphical representation of the program, or for any other suitable purpose.

Associating a transition with a first state S220 functions to link the first state to a program element (e.g., a second state, an event, a second transition, a program execution terminator, a sub-routine, a sub-state-machine, etc.) through the transition. In a first embodiment, the program element is a second transition, wherein Block S220 can include associating the first state with the second state through the transition. The states linked in Block S220 can be states indicated (e.g., selected) in Block S210, or alternately they can be other states associated with the program, or any other suitable states. The first and second state can be identical to each other or different from each other. The transition can have an origin and a destination, and can be directed from its origin to its destination. The transition can originate from the first state and be directed toward the second state, or alternately can originate from the second state and be directed toward the first state. In one variation, the transition includes a single origin and a single destination, such that the transition can only be associated with two states: an origin state and a destination state. In this variation, the transition can optionally be precluded (e.g., prevented) from concurrent origin and destination association with the same instance of a state icon (e.g., the transition cannot loop back on the same state). In a second variation, the transition can include one or more origins and one or more destinations. In a third variation, the transition can loop back on the same state. However, the transition origin and destination can be otherwise limited or enabled. In a second embodiment, Block S220 does not include associating the transition with a second state. Block S220 can additionally include associating the transition with the program element, or can exclude associating the transition with any additional program elements.

In a first embodiment, the transition can be associated with the first state in response to a user input (e.g., drag-and-drop input, touchscreen input, keyboard input, voice input). For example, the transition can be automatically associated with the first state in response to: all or a portion of a first state icon being dragged proximal or over a threshold portion of the second state icon (e.g., the entire first state icon being dragged proximal to the second state icon; wherein the first state icon includes a transition sub-icon, the transition sub-icon being dragged over a transition termination portion of the second state icon); adding a transition and linking a first and second end of the transition to the first and second states, respectively (e.g., selecting a transition icon from the tray and subsequently dragging an origin end of the transition to the first state icon and dragging a destination end of the transition to the second state icon; wherein a transition icon is displayed proximal to each state icon on the stage, selecting the transition icon proximal the first state icon and dragging it to the second state icon); receipt of the second state selection (e.g., after adding the first state, such as when the first state can be the only state in the virtual space; etc.), or otherwise linking the first and second states in response to receipt of any other suitable state interaction. The visual representation of the first and/or second state can additionally indicate that the state has been selected for transition association. For example, the first and second state icons can be highlighted in response to selection. Alternatively, the transition can be associated with states selected through a menu presenting state options, or selected by typing identifiers associated with the states, or by any other suitable selection process. Preferably, a transition can be allowed to originate from and terminate at any states, or any states selected from a set of states (e.g., the set of states selected for the current program), but alternately, some transition associations may be precluded. For example, all transitions can be precluded from originating from and/or terminating at one or more states (e.g., start state, end state, interrupt state); and/or specific transitions can be precluded from originating from and/or terminating at one or more states, preferably based on one or more characteristics of the transition (e.g., preclude origination from a first state based on termination at a second state, preclude termination at a first state based on origination from a second state, preclude origination from and/or termination at a first state based on association with a first event). In a second embodiment, in response to the selection of a first or second state icon associated with the first or second state, respectively (e.g., a selection received in Block S210), the transition can be automatically associated with the first and second states.

The transition can be represented graphically (e.g., a path connecting the graphical representations of the first and second state) in a graphical representation of the program. The shape and location of the graphical representation can be a straight line segment connecting the graphical representations of the first and second states, or can be determined automatically (e.g., based on the positions of the graphical representations of the first and second states, other states, and other transitions). The graphical representation can include indications of the direction of the transition (e.g., arrowheads, color changes, thickness changes), or alternately can be dictated by the user (e.g., by dragging along a desired path). In some embodiments, the positions and/or appearance properties of other graphical representations can be altered at a suitable time (e.g., in response to the association of a transition with two states, in response to receipt of a user request to automatically organize the graphical representation of the program).

In a specific example, a graphical representation of a program represents a first and second state and a first transition directed from the first state to the second state, wherein the graphical representation of the first transition is a line segment with endpoints at the graphical representations of the first and second states. In the specific example, in response to the association of a second transition with the first and second state, directed from the second state to the first state, the graphical representation of the first transition can be altered to be a first arc with endpoints at the graphical representations of the first and second states, and a graphical representation of the second transition can be displayed as a second arc with endpoints at the graphical representations of the first and second states, wherein the second arc is different from the first arc (e.g., mirroring the first arc, having different curvature than the first arc, having different color and/or thickness than the first arc). In the specific example, in response to association of a third transition with the first and second state, directed from the second state to the first state, the graphical representation of the third transition can be identical to the graphical representation of the second transition.

Block S220 can be repeated to associate additional transitions with states, wherein each state can be associated with one or more transitions. Each transition can additionally or alternatively be associated with one or more events. In repetitions of Block S220, additional transitions can be associated with the first and second state, with the first or second state and a third state, with a third and fourth state, or with any other suitable combination of states.

Block S230 recites creating a relationship between a transition and an event and can include selecting the transition S232, determining the event S235, and associating the event with the transition S238. Selecting the transition S232 can be performed automatically (e.g., automatically selecting the transition of Block S220 in response to performance of Block S220, automatically selecting a transition in response to an event associated with the transition becoming unavailable for use in the program), or can be performed in response to receipt of a user selection (e.g., user selection of the transition, user selection of an event associated with the transition, user selection of a state associated with the transition, etc.), or can be performed through any other suitable selection process.

Determining the event S235 can be performed automatically (e.g., in response to transition association with a state, transition creation, etc.). For example, the event can be a predetermined default event, or can be selected based on the program (e.g., based on a state, based on a type of state, based on events associated with transitions originating from a state, based on part of the program digraph structure, etc.), or can be selected randomly from a set of events, or can be otherwise suitably selected. Alternately, the event can be determined S235 in response to receiving a user selection, such as receiving a selection of an event icon, wherein the event icon can be associated with the event. However, the event can be determined in any other suitable manner. The event icon can include an illustration of the robot undergoing an event (e.g., a person speaking near the robot, a wall in front of the robot, the robot being pushed by a hand), or can be representative of an event, or can be otherwise associated with an event. In some embodiments, the user selection can be received using an event selection window. The event selection window can automatically open in response to performance of Block S220 (e.g., immediately following any performance of Block S220, following a performance of Block S220 only when a default state cannot be selected automatically), or can open in response to user selection of a set event option (e.g., selecting a transition, selecting an existing event associated with a transition, selecting a set event button). The event selection window or any other suitable event selection interface can include event options available to the user based on the robot capabilities and/or events associated with the first and/or second states. In response to event option selection, the selected event can be associated with the transition between the first and second states, such that the transition from the first state to the second state is performed in response to occurrence of the selected event.

Restrictions can be imposed regarding events available for a specific event determination process. In a first embodiment, every transition originating from a state can be required to not be associated with an event identical to the events associated with all other transitions originating from the state (e.g., all transitions originating from a common state must be associated with different events). To perform Block S235 in compliance with such a restriction, selection of events that would not satisfy this requirement (e.g., events associated with other transitions originating from the state, events that may be automatically associated with other transitions originating from the state) can be precluded. In some variations, event icons associated with events precluded from selection can be highlighted, grayed out, removed (e.g., not displayed), or otherwise indicated as precluded, or can remain unmarked. Alternately, automatic selection of an event that should not be available can be precluded, or compliance with such a restriction can be achieved in any other suitable manner. In one example, when a first and second transition each originate from a first state and a first event is already associated with the first transition, the method can include precluding selection of the first event for association with the second transition, such that a second event, different from the first event, must be selected for association with the second transition. However, event selection can be otherwise permitted or limited.

In a second embodiment, such a restriction can be omitted. In such alternate embodiments, an event or set of identical events associated with multiple transitions originating from a first state can lead to concurrent execution of multiple states, to sequential execution of multiple states, to execution of only one state, to continued execution of the first state, to any other suitable program execution, to program termination, or to any other suitable result. In specific examples, the event can be associated with a first transition directed from the first state to a second state, and a second transition directed from the first state to a third state. In the specific examples, when the program is in the first state, in response to occurrence of the event the program can progress to both the second and third states concurrently, to the second state and then the third state, to only one of the second and third state (e.g., chosen randomly, chosen based on a predetermined order, chosen based on a user input), can remain in the first state, can stop execution, or can behave in any other suitable manner.

In a third embodiment, the restrictions can be imposed on some events but not others. In one variation, whether or not an event can be reused for transitions associated with (e.g., originating from) a common state icon can be determined based on the state represented by the common state icon and/or the state represented by the opposing transition endpoint. In one example, the same event can be used for multiple transitions connected to a shared origin state when the unshared destination states of the multiple transitions are for different (e.g., distinct) robot subsystems and/or inputs. In a specific example, the same button push can cause the robot to concurrently transition from a first state to a plurality of destination states, wherein each destination state is for a different robot subsystem (e.g., drivetrain, lights, and audio). In a second example, when the destination states act on the same subsystem (e.g., both act on the drivetrain), the same event can be precluded from being associated with the transitions to said destination states from the common origin state.

In a second variation, whether or not an event can be reused for transitions associated with (e.g., originating from, terminating at, etc.) a common state icon is dependent on the event itself. For example, multiple transitions connected to (e.g., originating from) a common state icon can be associated with the same temporal event, while only one transition connected to (e.g., originating from) the common state icon can be associated with a specific robot input (e.g., button, video, or audio). However, events can be otherwise restricted from association with the transitions.

Block S238 recites associating the event with the transition. Block S238 is preferably performed automatically in response to completion of Blocks S232 and S235, but can alternately be performed in response to a user selection (e.g., event-transition association selection), or can be performed in any other suitable manner. The association preferably includes a programmatic association (e.g., when a program is in a first state, the occurrence of an event programmatically associated with a transition originating from the first state can prompt the program to move to a second state, wherein the second state is at the destination of the transition), but alternately can be any suitable association. A graphical representation of the association (e.g., an event icon displayed near the graphical representation of the transition) is preferably displayed, but the association can be otherwise indicated, or can be unindicated.

Block S230 can be repeated to create additional relationships between transitions and events, or additional relationships between transitions and events can be created in any other suitable manner. Each transition can be associated with one or more events. In some embodiments, when a transition is associated with multiple events, all events associated with the transition can be required to occur before the robot state transitions from the first state to the second state, wherein different event options leading to the same state transition are preferably associated with different transitions between the two states, but can alternately be associated with the same transition. In a second embodiment, when the transition is associated with multiple events, a given event of the plurality must occur to trigger robot state transition. In a third embodiment, the robot state can be transitioned in response to occurrence of any of the events associated with the transition(s) connecting the first state to the second state. In a fourth embodiment, the robot state can be transitioned in response to occurrence of a predetermined number, specified subset, specified series, or other combination of the events associated with the transition(s) connecting the first state to the second state. However, multiple events associated with a single transition can be interpreted in any other suitable manner. Multiple events can be associated with the transition by selecting the transition after it has been added to the stage (e.g., wherein subsequent selection can open the event selection window), but can alternatively be associated with the transition by dragging the event to the transition or otherwise associating an event with the transition. In the former variation, the event previously associated with the transition can be highlighted, grayed out, or otherwise indicated as already selected. However, the previously selected event(s) can remain unmarked. The multiple events associated with a transition preferably have no order, but can alternatively be ordered (e.g., wherein the event order can be automatically determined, user-specified, or otherwise determined). Alternatively, when an ordered set of events is desired, the first and second states can be linked by a set of intermediary "do nothing" states, connected in sequence by the ordered set of events. In this variation, the robot transitions to the next "do nothing" state (e.g., maintains the prior state) in response to the occurrence of a first event, and waits for further input (e.g., the next event to occur) before transitioning to the next state.

The program can additionally include one or more start states, which can be displayed on the stage (e.g., represented by start icons), or displayed elsewhere, or alternately can be not displayed. The start states can be automatically included in the program (e.g., automatically added in response to creation of a new program, automatically added in response to connecting to or identifying a toy robot), or can be added in response to receipt of a user selection to add a start state, or can be otherwise introduced to the program. In one variation, at least one state must be connected to a start state by a transition for the program to execute. However, a start state can be otherwise used in writing the program. The number of start states in a program may be required to be equal to a specific number, or may be limited to be no more than a specific number. For example, the specific number may be one, or may be one for each logical unit (e.g., robot subsystem, controlled robot, controlled robot model, predefined robot group, etc.), or may be any other suitable number. Alternately, the number of start states may be otherwise restricted, or may be unrestricted.

The program can additionally include one or more listener states, which can be displayed on the stage (e.g., represented by listener icons), or displayed elsewhere, or alternately can be not displayed. The listener states are preferably added to the program in response to receipt of a user selection to add a listener state, but additionally or alternatively can be automatically included in the program (e.g., automatically added in response to creation of a new program, automatically added in response to connecting to or identifying a toy robot), and/or otherwise introduced to the program. A listener state is preferably associated with one or more transitions originating from the listener state. When an event occurs, wherein the event is associated with a transition originating from a listener state, program execution preferably results in a transition to the state at the destination of the transition, even if the program is not currently in the listener state. Preferably, no transitions terminate at listener states (e.g., the user is precluded from associating transition destinations with listener states). Alternatively, transitions can terminate at listener states (e.g., wherein transitioning into a listener state through a transition is analogous to transitioning into other states of the program).

When a state or event has one or more user-adjustable parameters (e.g., the pattern of lights illuminated in a light state, the audio recording played in a sound generation state, the distance and direction traveled in a motion state, the threshold volume for a sound detection event, the amount of time for a timer event), the parameter values for the user-adjustable parameters can be specified by the user. The user-adjustable parameters can be displayed, and program writing can be paused until a parameter value or exit option is selected (e.g., through a menu of parameter values, through a numerical control, through a text input). Parameter value selection preferably associates the parameter value with the state instance or event instance, but can be otherwise stored. The parameter value can be associated with the state and/or event by: incorporating the parameter value into the respective state instruction or event instruction (e.g., replacing a predetermined variable with the selected parameter value, etc.), or otherwise associated with the respective state or event. The user-specified parameter value can be received at a control for selecting the parameter value (e.g., control panel) displayed on the user device, received as a text input, or otherwise received.

Receiving the program S200 can additionally include creating a new state, which functions to enable the user to expand the set of states that can be used to program the robot. The new state preferably includes fixed parameter values for one or more user-adjustable parameters but can alternatively include a range of parameter values for one or more user-adjustable parameters. The fixed parameter values can be for a single point in time, for a period of time (e.g., wherein each timestamp within the period of time is associated with a fixed parameter value for the user-adjustable parameters), or for any suitable amount of time. Additionally or alternatively, the new state can be a sub-routine and/or sub-state-machine. In a specific variation, the new state can be created using a state creation tool, wherein the available parameter value options for different user-adjustable parameters (wherein the parameter values and/or user-adjustable parameters can be determined based on the robot identifier) can be presented in graphical form. However, the new state can be automatically generated (e.g., based on prior selected states, based on other user-generated states, etc.), received from other users, or otherwise generated. The new states can additionally be created using the drag-and-drop paradigm (e.g., wherein different parameter values are selected by dragging a slider or selecting a predetermined option, such as a waveform, etc.), but can alternatively be created using a text-based paradigm, or otherwise created. In response to completion of the creation of a state (e.g., in response to selection of a "save" option during state creation, in response to a predetermined amount of time elapsing without user interaction during state creation), the new state, including the parameter values, can be stored (e.g., written to memory) in association with the robot identifier, user identifier, user device, or stored in association with any other suitable piece of information. The new state can be stored by the user device, a remote computing system, the robot, or by any other suitable computing system as part of the set of predefined states for the robot. The new state can be stored and/or available to the user: transiently, permanently, or for any other suitable period of time. The new state can appear in the state tray in response to creation, such that the user can use the new state in writing the program, or can be automatically added to the program in response to creation, or can be otherwise made available for programming.

Receiving the program S200 can additionally include editing the states, events, and/or transitions on the stage. The states, events, and/or transitions can be replaced, removed, edited, or otherwise adjusted. States can be replaced by dragging a new state over the old state within the stage, such that the new state icon overlaps the area of the old state icon by a predetermined threshold (e.g., more than 50%). State replacement preferably preserves the transition connections with other states, but can alternatively remove the transition connections. However, the states can be otherwise replaced. States can be removed by dragging the state to a virtual trashcan, but can be otherwise removed. States can be edited by selecting the states and selecting a new sub-option, but can alternatively be otherwise edited. Events can be replaced or edited by selecting the event (and/or associated transition) and selecting a new event from the event option window, but can alternatively be otherwise edited. Events can be removed by dragging the state to a virtual trashcan, but can be otherwise removed. In a first variation, transition endpoints cannot be edited, and transitions can only be removed entirely from the stage (e.g., wherein the associated events can additionally be removed with transition removal). In a second variation, the transition endpoints can be edited by selecting the endpoint and dragging the free transition end to a new stage. However, the transitions, states, and/or events can be otherwise edited. The edited state, event, and/or transition can be available: indefinitely, for the programming session, for a predetermined period of time, or for any other suitable temporal period.

The method 1 can include executing the program S300. Executing the program S300 can include sending an instruction to a robot S310 and at the robot, in response to receiving the instruction, operating according to the instruction S320. In some embodiments, Block S300 can also include sending sensor data S330 (e.g., from the robot), receiving data indicative of robot operation S340, and determining that an event has occurred S350. Block S300 can be performed in conjunction with a single robot or with a group of robots (e.g., robots of a specific model, robots in a predefined group, robots selected by a user, robots associated with a user device), or can be performed without a robot. Additionally or alternatively, executing the program S300 can include virtually simulating robot execution of the program (e.g., with a virtual model of the robot, by animating the state graphics, etc.), or any other suitable execution of the program.

Program execution S300 can be performed in response to occurrence of an execution incident (e.g., execution event). The execution incident can be: selection of an execution icon displayed on the user device, a predetermined time period or timestamp being met, a predetermined state program being created, a predetermined state or event parameter being met (e.g., a threshold number of states being selected, a threshold number of events being selected, etc.), connection with a toy robot (e.g., a predetermined robot, any robot suitable for program execution), receipt of an indication from a toy robot (e.g., an indication that the robot is ready to begin execution, an indication that the robot battery has exceeded a threshold charge value or SOC), or be any other suitable execution incident. The program is preferably executed within a predetermined period of time after execution incident occurrence (e.g., within 1 second, within 10 seconds, immediately upon connection with the toy robot and execution incident occurrence, etc.), executed immediately upon execution incident occurrence, or be executed at any other suitable time.

The method 1 can include determining a set of machine code blocks. Determining a set of machine code blocks functions to determine instructions for robot control and/or operation. The machine code blocks are preferably robot-readable instructions (e.g., machine code), but can alternatively be higher-level instructions or be any other suitable set of instructions. A machine code block is preferably determined for each state within the program (e.g., within the state machine), but a machine code block can alternatively be determined for multiple states within the program (e.g., wherein the machine code block includes instructions for and/or to operate in multiple states), multiple machine code blocks can be determined for a single state within the program, or any suitable number of machine code blocks can be determined for any suitable number of states within the program. Each machine code block is preferably specific to a robot sub-system (e.g., the drivetrain, the lights, the audio, etc.), but can alternatively be for multiple robot sub-systems. The machine code blocks can be determined in response to state addition to the program, in response to a program execution selection (e.g., selection of the "start" or "play" icon; selection of a "run" option; etc.), in response to a precursor event being met, in response to the machine code for a precursor state being sent to the robot, or be determined at any other suitable time. The machine code blocks are preferably determined by the user device, but can alternatively or additionally be determined by a remote computing system, by the robot (e.g., wherein the machine code blocks can be stored within the robot and retrieved in response to receipt of an execution command for the block), or by any other suitable computing system. The machine code blocks can be retrieved based on the state from a database storing code for each state (e.g., based on the output variable value, based on a state identifier associated with the state icon, etc.), generated based on the state (e.g., calculated, populated using a template, assembled from a set of template code blocks, etc.), or be otherwise determined. In one variation, the machine code block can be generated upon state creation (e.g., synthesized from sub-blocks associated with the selected variable values for the new state) and stored in a database, on the user device, or in the robot. In response to state addition to the program and/or execution of a program including the state, the respective machine code can be retrieved from storage and sent to the robot. In a second variation, the machine code block for a state can be generated in response to determining that an event associated with a transition terminating at the state has occurred (e.g., S350; in near-real time, such as when the state becomes active; etc.), and an instruction to operate in the state can subsequently be sent to the robot (e.g., S310) in response to machine code block generation. However, the machine code can be otherwise determined.

Machine code blocks are preferably not determined for events and/or transitions, wherein the user device and/or robot inputs are preferably processed on the user device to determine whether the events are satisfied. Alternatively, machine code blocks can be determined for events and/or transitions, wherein the event and/or transition machine code blocks can subsequently be sent to the robot after determination. In this variation, the robot can process the robot inputs on-board to determine whether the events have been satisfied. In this variation, the event and/or transition machine code blocks can be sent to the robot: after the machine code block for the preceding state is sent to the robot, concurrent with the machine code block for the preceding state and/or following state(s), before the machine code block for the preceding state, or at any other suitable time. However, the machine code blocks for events and/or transitions can be otherwise determined and used.

Block S310 recites sending an instruction to a robot. The instruction is preferably an instruction to operate in a state (e.g., to turn a first wheel at a first rate and a second wheel at a second rate), more preferably the state corresponding to the current point in program execution (e.g., the current state of the state machine), but can be any suitable instruction. The instruction can include a machine code block, or can include a reference to a machine code block (e.g., an identifier associated with a machine code block previously sent to the robot), or can include a call to a robot-presented function, or can be any other suitable instruction for robot operation. In some variations, the instruction can include a stop command (e.g., an instruction to the robot to stop execution of a previous instruction before operating in the state requested by the current instruction), but in other variations the instruction does not include a stop command (e.g., wherein a subsequently received instruction can be queued or override the current instructions being performed, can be performed concurrently with the current instructions, etc.). When a state has user-adjustable parameters, the associated parameter values are preferably incorporated into the corresponding instruction (e.g., integrated into a machine code block, included in a list of parameter values in the instruction).

Figure 3:
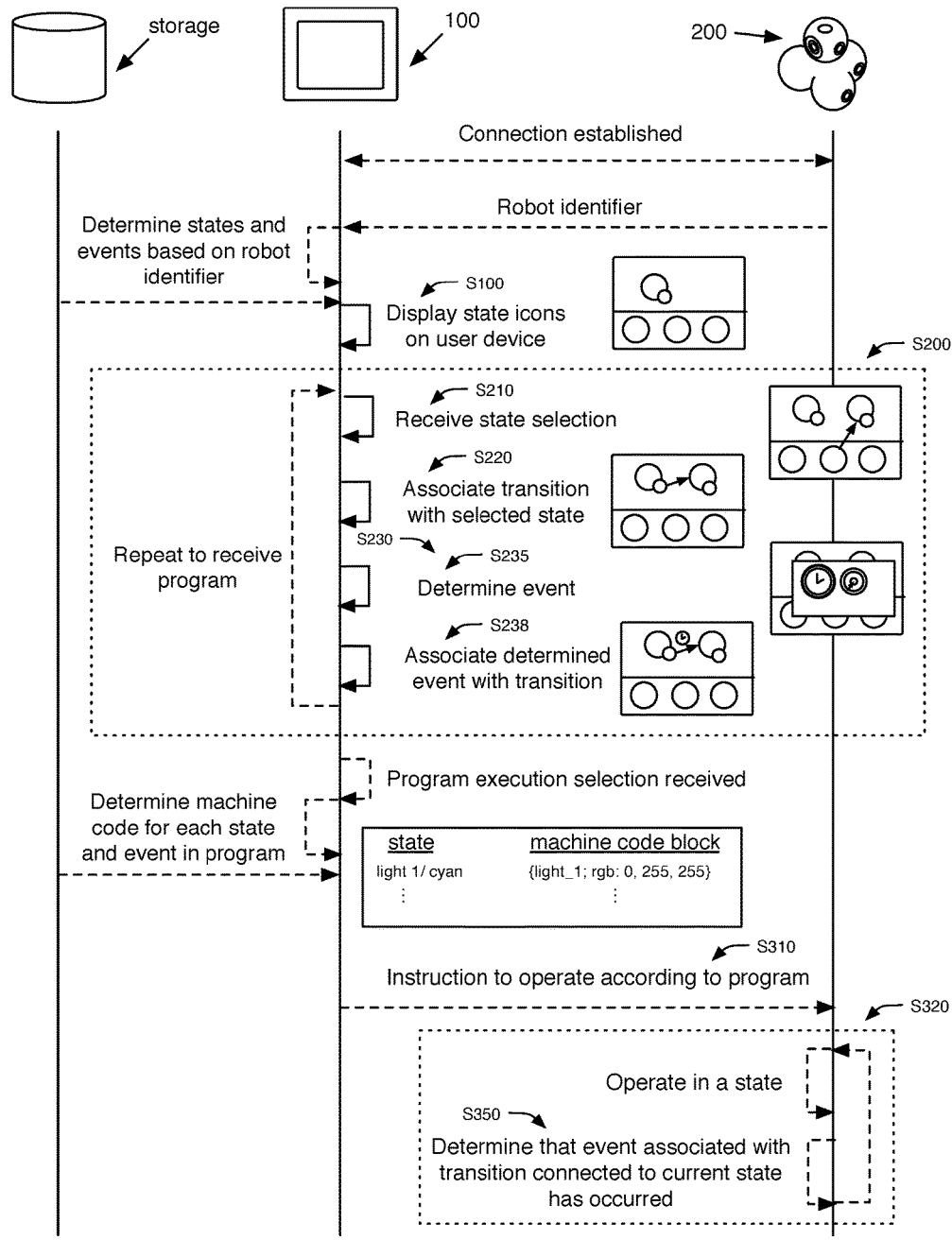
FIG. 3 is a schematic representation of a second variation of the method.

The instruction is preferably sent to the robot to be controlled, but can alternatively be sent to any other suitable robot. The instruction is preferably sent over a data connection between the robot and the user device, but can alternatively be sent over a secondary data connection, a one-way data connection, or be sent in any other suitable manner. The instructions for each state are preferably sent one at a time (e.g., sent piecemeal), after each preceding event has been satisfied. In some variations, the instruction for a state can include sub-instructions, each of which can be sent one at a time (e.g., sending a first sub-instruction corresponding to a first stage of an animation, then, after a predetermined amount of time, in response to acknowledgment from the robot, or in response to determination that an event has occurred, sending a second sub-instruction corresponding to a second stage of the animation). Alternatively, the instructions can all be sent together (e.g., wherein execution commands for individual code blocks can be sent after the user device has determined that an event has been satisfied), as shown in FIG. 3, or sent in any other suitable grouping. Instructions for each event are preferably not sent to the robot, but can alternatively be sent to the robot (e.g., wherein an instruction encoding the entire program can be sent wholesale to the robot, wherein the instruction includes machine code blocks corresponding to a state and to events associated with transitions originating from the state, etc.). However, the instruction can be otherwise sent to the robot.

In response to receiving the instruction, operating according to the instruction at the robot S320 functions to execute an action at the robot. The instruction is preferably an instruction to operate in a state, in which case operating according to the instruction includes operating in the state (e.g., for a forward motion state, operating wheels to move the robot forward). In one variation, operating according to the instruction includes controlling a robot subsystem associated with the state to operate in said state. However, the robot can be otherwise operated according to the instruction. Operating according to the instruction can include stopping other operation (e.g., stopping all operation before beginning forward motion, stopping head rotation but not changing light operation, etc.). Stopping can be performed in response to a stop command, in response to receipt of an instruction, or in response to any other suitable occurrence. Operating according to the instruction preferably includes executing machine code associated with the instruction, but can include any suitable operation. S320 is preferably performed for each successive instruction received by the robot (e.g., immediately upon receipt, after a delay after receipt, cached until occurrence of an event, etc.), but can alternatively be performed for a subset of the received instructions or for any other suitable set of instructions.

Sending sensor data at the robot S330 functions to communicate data potentially indicative of the occurrence of an event. The sensor data is preferably robot sensor data, but can alternatively be user device data, or be any other suitable data. The sensor data can be sampled by the robot (e.g., by the robot sensors) and/or recorded by the robot (e.g., by the robot processor and/or memory), or otherwise determined. The sensor data can include sensor measurements, sensor signals, data synthesized from one or more sensor measurements (e.g., ratios between different types of sensor measurements, measurement rate of change, etc.), or any other suitable sensor data. The sensor data can be sent by the robot continuously, or sent in batches (e.g., sent at a predetermined frequency, sent in response to receiving a request to send one or more batches), or sent in any other suitable manner. The robot preferably samples, records, and/or sends the sensor data during instruction execution (e.g., during robot operation in the first state), but can alternatively obtain and/or process sensor data in any other suitable manner at any other suitable time. The robot can begin sampling, recording, and/or sending the sensor data substantially concurrently with a communication or execution incident (e.g., connecting to the user device, receiving an indication that execution will begin, receiving an instruction, operating according to an instruction S320, completing operation according to an instruction, receiving a request for sensor data, etc.), after a time interval (e.g., a predetermined time interval, a time interval specified by an instruction) following a communication or execution incident, in response to entering a state (e.g., an "on" state), or at any other suitable time. The robot can stop sampling, recording, and/or sending the sensor data substantially concurrently with a communication or execution incident (e.g. disconnecting from the user device, receiving an indication that execution will end, receiving an instruction, operating according to an instruction S320, completing operation according to an instruction, receiving a request to stop sending sensor data, losing connection to the user device, etc.), after a time interval following a communication or execution incident, in response to entering an off state, or at any other suitable time. The robot can continue sampling, recording, and/or sending the sensor data (e.g., continuously, sporadically, at a predetermined frequency, etc.) during the time interval between beginning sampling, recording, and/or sending the sensor data and ending sampling, recording, and/or sending the sensor data.

Receiving data indicative of robot operation S340 functions to determine data indicative of the occurrence of an event. The data indicative of robot operation is preferably robot sensor data (e.g., wherein the sensor data is received from the toy robot), but can alternatively be user device data, or be any other suitable data. The data indicative of robot operation is preferably the sensor data sent in Block S330, but can alternatively be data sent in any other suitable manner. In one example, the data indicative of robot operation includes robot component power provision parameter values (e.g., amount of power, cycle time, cycle frequency, etc. provided to a robot speaker, motor, or other component, as controlled and recorded by a robot processing unit). In a second example, the data indicative of robot operation includes robot sensor data, such as data from a robot proximity sensor, light sensor, or speaker. In a third example, the data indicative of robot operation includes user device data, wherein the user device records images, video, audio, or any other suitable input indicative of robot operation.

The data is preferably determined (e.g., received) by the user device, but can alternatively be determined by the robot, a remote computing system, or by any other suitable system. The data is preferably measured by the robot sensors and sent by the robot to the user device, but can alternatively be measured by the user device (e.g., by the camera or microphone of the user device), be measured by a second user device, be measured by a second robot, be measured by an independent sensor or sensors (e.g., camera, microphone, proximity detector, trilateration system), or be measured by any other suitable input. All data measured by the robot is preferably sent to the user device (e.g., streamed to the user device, sent at a predetermined frequency, etc.), wherein the user device preferably processes the data and determines whether an event was satisfied, wherein the event is associated with the transition connected to the previous state for which machine code was sent to the robot. Examples of data indicative of robot inputs include robot acceleration (e.g., rolling, dropping, etc.), robot button presses, sounds, the identifiers of sound sensors detecting sound, light intensity, the identifiers of light sensors detecting light, component motor feedback, visual system measurements, or any other suitable data indicative of an event.

Block S350 recites determining that an event has occurred. Determining that an event has occurred can be performed at the user device, at the robot, at a second user device, at a second robot, or at any other suitable device. Determining that an event has occurred can be performed based on data indicative of robot operation, preferably data indicative of robot operation received in Block S340, but additionally or alternatively can be performed based on time data, preferably time elapsed after a communication or execution incident (e.g., sending an instruction, receiving acknowledgment of instruction receipt, beginning execution), any suitable sensor data, or any other suitable information. In one example, the method can include determining that an event has occurred based on the set of sensor measurements received from the robot (e.g., before, during, and/or after instruction execution). Determining that an event has occurred can include estimating, calculating, receiving information indicating that the event has occurred, or any other suitable process of determining that the event has occurred. For example, determining that an event has occurred can include condition satisfaction (e.g., if/then statement), pattern matching, regression (e.g., estimating that the probability an event has occurred exceeds a threshold probability), and/or classification.

Executing the program S300 preferably includes repeating Block S310, more preferably repeating all elements of Block S300, one or more times, according to the program (e.g., for a plurality of states). After the first performance of Block S310, wherein a first instruction is sent to the toy robot to operate in a first state, repeating Block S310 to send a second instruction to the toy robot to operate in a second state functions to progress the robot along the program. The second instruction is preferably sent in response to Block S350, wherein the event that is determined to have occurred is preferably associated with a transition that originates from the first state (associated with the first instruction) and terminates at the second state (associated with the second instruction), but alternately can be associated with any other transition or not be associated with a transition. Alternately, the second instruction can be sent at any other suitable time. In a first example, the event associated with a transition connecting a first and second state can be the robot being thrown into the air, wherein the instruction to operate in the second state can be sent in response to the accelerometer measurements received from the robot indicating that the robot was thrown into the air. In a second example, the event associated with a transition connecting the first and second state can be a timer, wherein the second state is preferably entered upon expiration of the timer. In a first variation, the user device can send the instruction to operate in the second state in response to timer expiration, wherein the user device tracks the time. In this variation, the time can be tracked from instruction transmission to the robot, from an instruction performance initiation time (e.g., determined by the user device, based on the sensor data received from the robot), or from any other suitable start time. In a second variation, the user device can send a first machine code block for the first state, wait for the robot to send back data indicative of first machine code block performance, track the amount of time after receipt of the data indicative of first machine code block performance, and send the second machine code block for the second state when the amount of time substantially matches the time specified by the timer. However, the second instruction can be sent at any other suitable time.

Robot sensor data processing and subsequent machine code block transmission to the robot can be repeated until the program terminates. The program can terminate in response to receiving a "stop" selection from the user, reaching a "stop" state in the program, reaching a state with no subsequent transitions in the program, determining that a program termination condition associated with the robot (e.g., low robot battery charge, robot subsystem failure, robot failure to follow an instruction, robot approaching a maximum range from the user device or other device) has been reached (e.g., based on data received from the robot, based on robot operation data, etc.), until a preset time has elapsed (e.g., total program execution time, time without a state change, time without user input), or at any other suitable time. However, the program can be otherwise executed by the robot and/or the user device.

Executing the program S300 can include tracking the current state of program execution (e.g., as related to the state machine), preferably at the user device, but alternately at the robot, at another robot or user device, or at any suitable device. Tracking the current state can include tracking the instructed state (e.g., a first state, wherein the instruction sent in the most recent performance of Block S310 is an instruction to operate in the first state), tracking the state in which the robot is operating (e.g., based on confirmation received from the robot, determined from data indicative of robot operation), or tracking any other state. An indication of the current state (e.g., indication that the robot has entered the current state) can be displayed during program execution, not be displayed at all, or otherwise presented. The indication is preferably displayed on the graphical representation of the state machine (e.g., in the graphical representation, highlighting the state icon associated with the current state), but alternately can be displayed as a graphical representation of the state independent of any graphical representation of the state machine, can be displayed as text, or can be otherwise suitably displayed. The indication can be displayed beginning substantially concurrent with sending the instruction to operate in a state (e.g., within five seconds of sending the instruction, within 500 ms of sending the instruction, within 30 ms of sending the instruction, etc.), substantially concurrent with determining that the robot is operating in the state or has entered the instructed state, after some preset time delay, in response to receiving a request to display the current state, or at any other suitable time.

Executing the program S300 can occur automatically in response to some or all of Block S200, or can be performed in response to a program execution selection (e.g., selection of the "start" or "play" icon, selection of a "run" button on the robot), in response to connecting to the robot, detecting another robot, determining information (e.g., about the robot, about another robot), or any other suitable occurrence. Executing the program S300 can occur immediately in response to an occurrence, after a preset delay (e.g., a delay time specified by the user through a timer function, a delay time specified by the robot or the user device), or at any other suitable time interval. Alternately, executing the program S300 can occur at a preset time (e.g., a time of day specified by the user through an alarm function, a time and date specified by the robot or user device, on the birthday of a user), or at any other suitable time.

In some embodiments, user-adjustable parameters associated with a first state or event can be dependent upon factors other than the first state or event (e.g., a second state or event, a previous iteration of the first state or event, sensor data received in Block S340). In a first example, wherein a head rotation state includes a user-adjustable parameter defining the rotation speed, the user specifies that the rotation speed is to be determined based on which state the robot was operating in immediately before operating in the head rotation state. In a second example, wherein a forward motion state includes a user-adjustable parameter defining the distance to move, the user specifies that the distance is to be a function of the number of times the forward motion state has been entered during program execution (e.g., for the third iteration of the forward motion state, the robot is to move forward three inches). In a third example, wherein a light-emission state includes a user-adjustable parameter defining the color of light to emit, the user specifies that the color of light should be determined by audio data specifying the color (e.g., robot is to emit green light in response to audio data that is determined to be an utterance of the word "green").

In other embodiments, some or all user-adjustable parameters are precluded from being dependent upon some or all such factors (e.g., prior states, sensor data, etc.). For example, in Block S200, the user device receiving the program can provide no interface for creating such dependencies. In still other embodiments, the parameter values for each state or event can be independent of the parameter values for other states or events (selected or unselected), such that parameter values are not passed between states linked by a transition. However, states and/or events can receive and/or be defined by parameter values received from other, secondary states and/or events connected to or associated with the first state and/or event by one or more transitions. However, parameter values can be otherwise passed, or be precluded from passing between, different states or events.

The method 1 can additionally include providing a preview of a state or event. Providing a preview of a state or event can include virtually simulating robot execution of the state (e.g., with a virtual model of the robot, by animating the state graphics, etc.) or occurrence of the event (e.g., by displaying a representation of event occurrence, by animating the event graphics, etc.).

Figure 14:
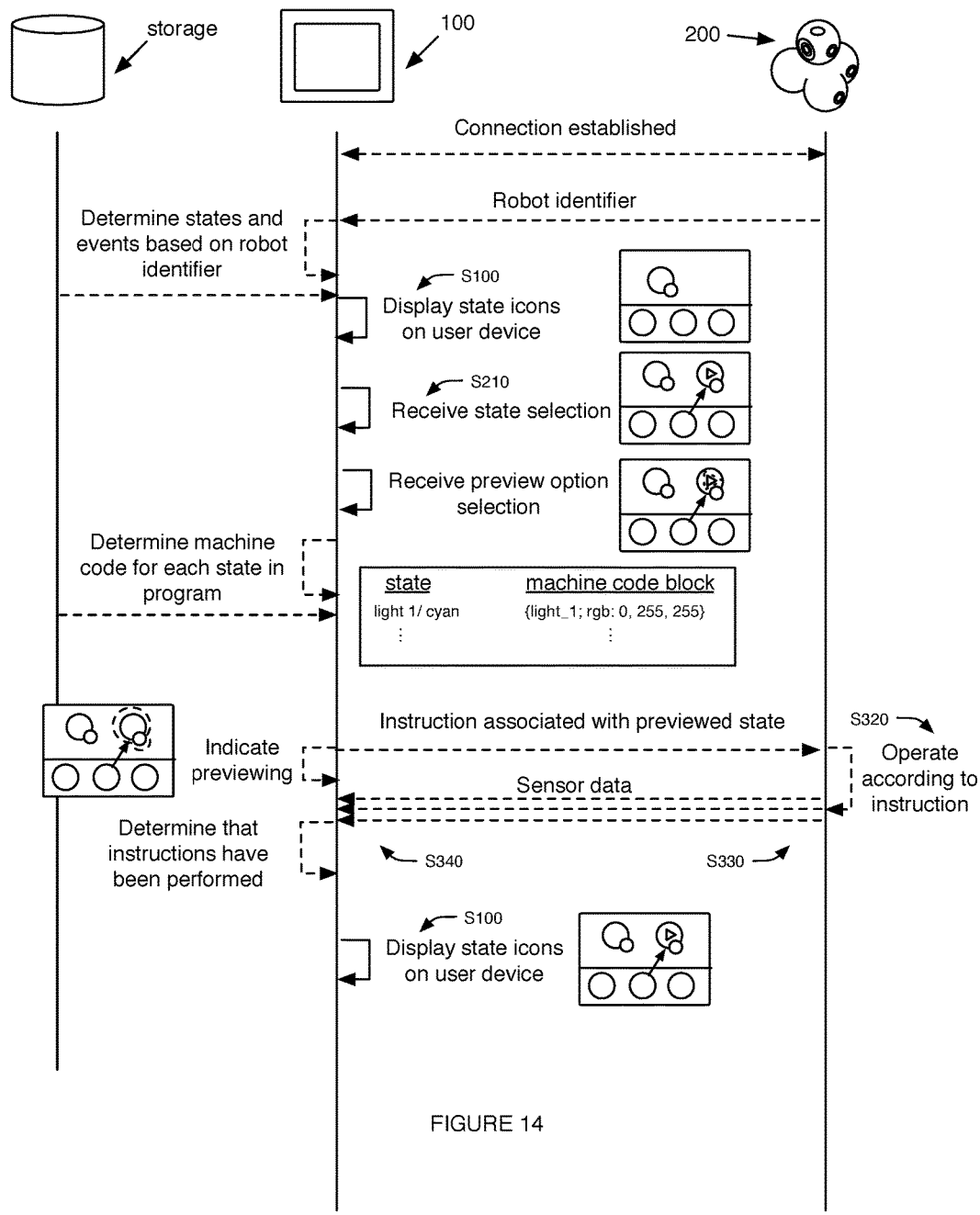
FIG. 14 is a specific example of previewing a state.

Providing a preview of a state can additionally or alternatively include sending an instruction associated with the previewed state, preferably to a connected robot but alternately to any suitable device, which can function to provide substantially instantaneous feedback on how the state manifests on the robot to the user (example shown in FIG. 14). The instruction can be an instruction for the robot to operate in the state (e.g., be the instructions associated with the previewed state, such as the machine code, etc.); an instruction for the robot to perform a preview action associated with the state, preferably a preview action representative of operating in the state (e.g., similar to operating in the state, but occurring for a shorter or longer duration, at a lower or higher volume, over a shorter or longer distance, etc.); or any other suitable instruction. In a first example, wherein operating in the state includes playing an audio recording, the preview action can be playing the audio recording in a different manner (e.g., playing at an altered volume and/or speed, playing a truncated portion of the recording). In a second example, wherein operating in the state includes motion, a preview action can be moving in a similar but different manner (e.g., following the same path but at a different speed, following a similarly-shaped path but with shorter path segments). The instruction can be sent in a manner similar to that described in Block S310, or can be sent in any other suitable manner.

Providing a preview of an event can additionally or alternatively include determining that a condition has been met (e.g., the event has occurred, a preview event similar to the event has occurred) and, in response to determining that the condition has been met, indicating that the condition has been met. Determining that the condition has been met can be performed in a manner similar to that described in Blocks S340 and/or S350, or can be performed in any other suitable manner. In a specific example, the toy robot can be operational and streaming sensor data or other robot operation data to the user device throughout the programming and/or preview process, wherein the user device determines that the previewed event has occurred based on the robot operation data. In a second specific example, the user device can send a streaming instruction to the robot in response to receipt of the event preview request, wherein the robot sends (e.g., streams) robot operation data to the user device in response to streaming instruction receipt, and wherein the user device determines occurrence of the previewed event from the streamed robot operation data. In a third specific example, the user device can send an instruction associated with the previewed event to the robot in response to receipt of the event preview request, wherein the robot determines occurrence of the previewed event and subsequently sends an indication to the user device that the previewed event has occurred. Indicating that the condition has been met can include displaying an indication on the user device (e.g., highlighting the event icon or the transition associated with the event, displaying the event icon, displaying text), sending an instruction to the robot to perform an action (e.g., rotate quickly, turn on lights, play an audio file), or any other suitable indication.

Providing a preview of a state or event can occur in response to receiving a selection of a state icon or event icon (e.g., providing a preview of a state in response to receiving selection of an icon associated with the state in Block S210); in response to receiving a selection of a parameter value; in response to receiving a selection of a preview option (e.g., selection of a preview button displayed on the user device, actuation of a preview switch on the robot); in response to receiving a selection to edit a state, event, or transition; in response to any other suitable preview occurrence; or at any other suitable time. Providing a preview can be performed substantially concurrent with the preview occurrence, within a predetermined time period after the preview occurrence (e.g., within ten seconds after, within 1 second after, within 50 ms after, etc.), after a predetermined delay time interval, or at any other suitable time interval. A preview button (e.g., preview icon, preview option, etc.) can be displayed on the stage, in a state or event selection tray or menu, in a user-adjustable parameter setting menu (e.g., displayed concurrently with the control for selecting a parameter value), in a state creation tool, or in any other suitable user interface element of the user device display. The state or event preview button can be displayed in response to receipt of a state or event icon selection, or displayed at any suitable time in any other suitable manner. The preview icon can be different from an execution icon (e.g., run option) or be the same. Providing a preview is preferably not performed during program execution, but alternately can be performed during program execution (e.g., by sending instructions to the robot to stop operating in a state, then to perform a preview action, and then to resume operating in the state).

Figure 4:
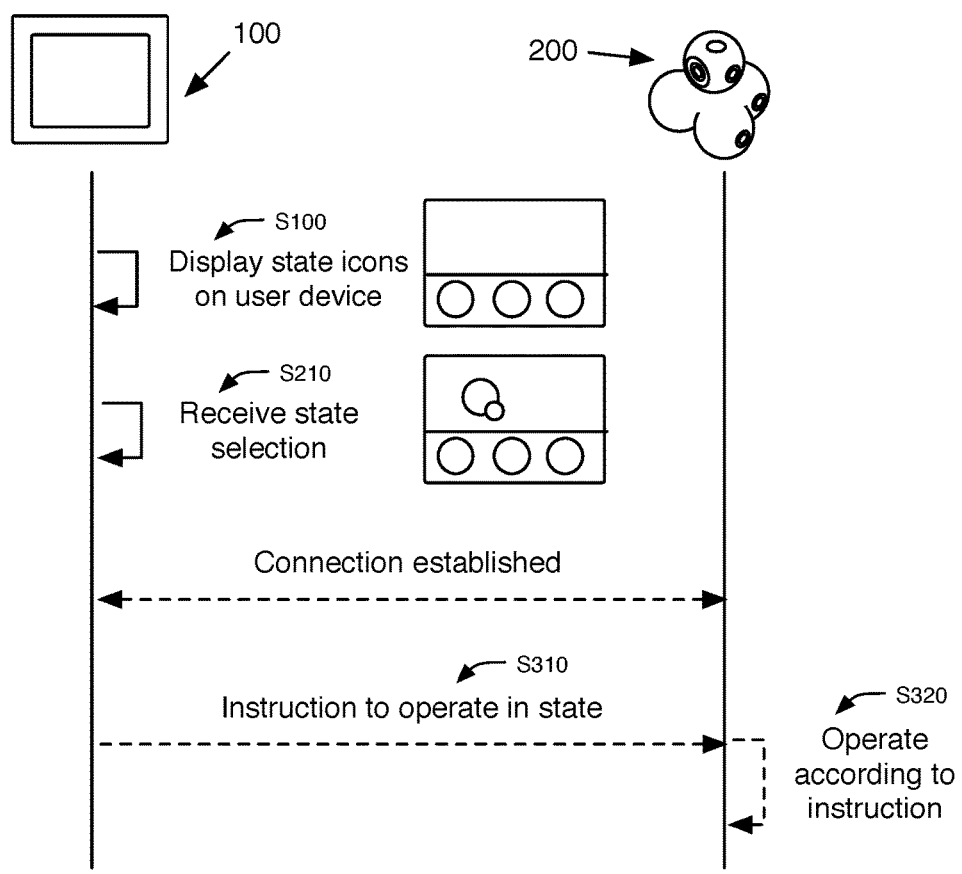
FIG. 4 is a schematic representation of a variation of real-time robot response during program scripting.
Figure 5:
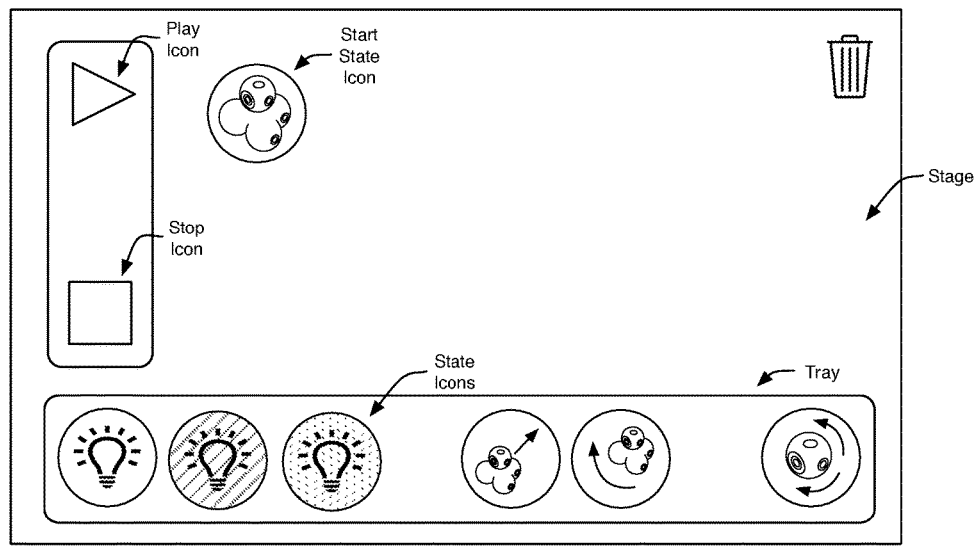
FIG. 5 is a specific example of a visual programming interface without any added states.
Figure 6:
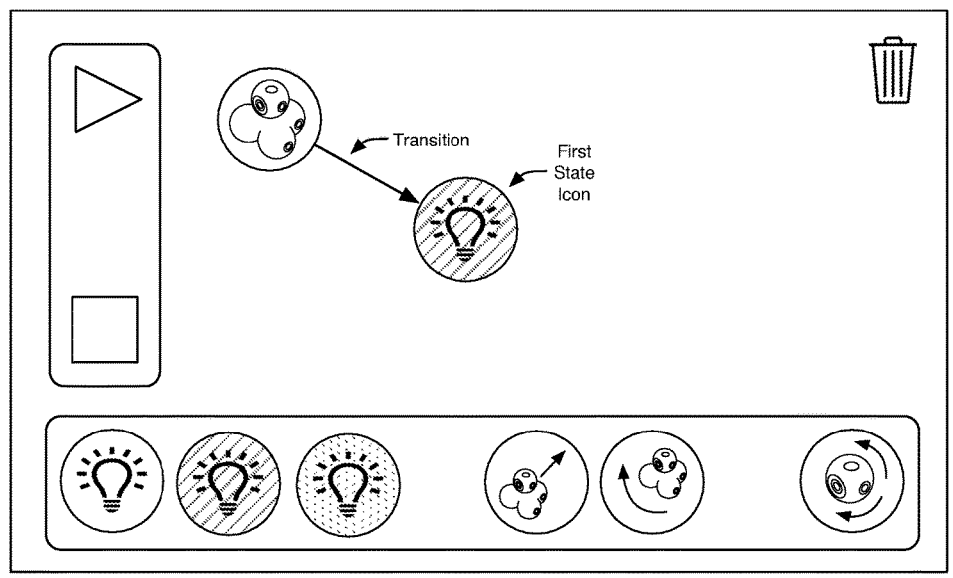
FIG. 6 is a specific example of a visual programming interface with a first state and a transition connecting the start state with the first state.
Figure 7:
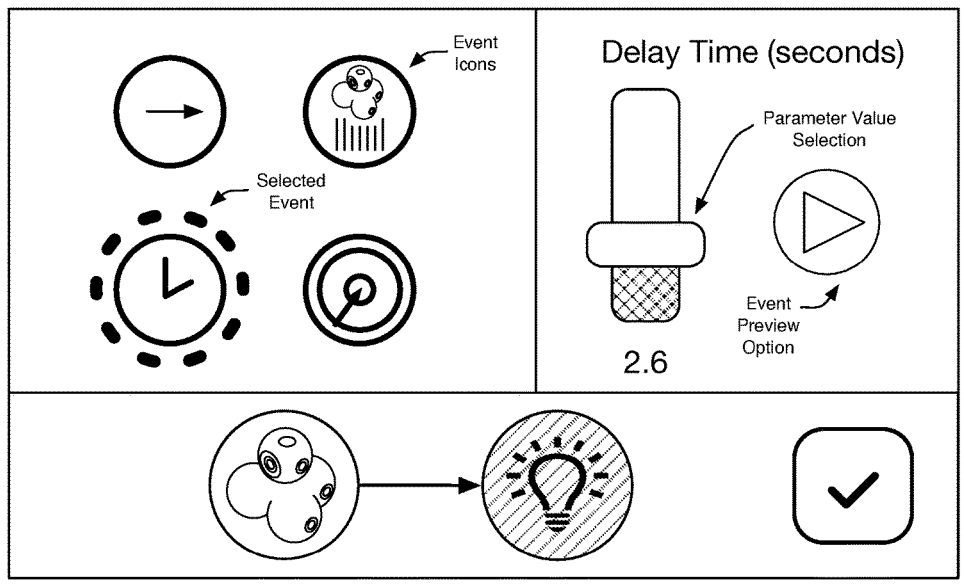
FIG. 7 is a specific example of the event option selection window.
Figure 8:
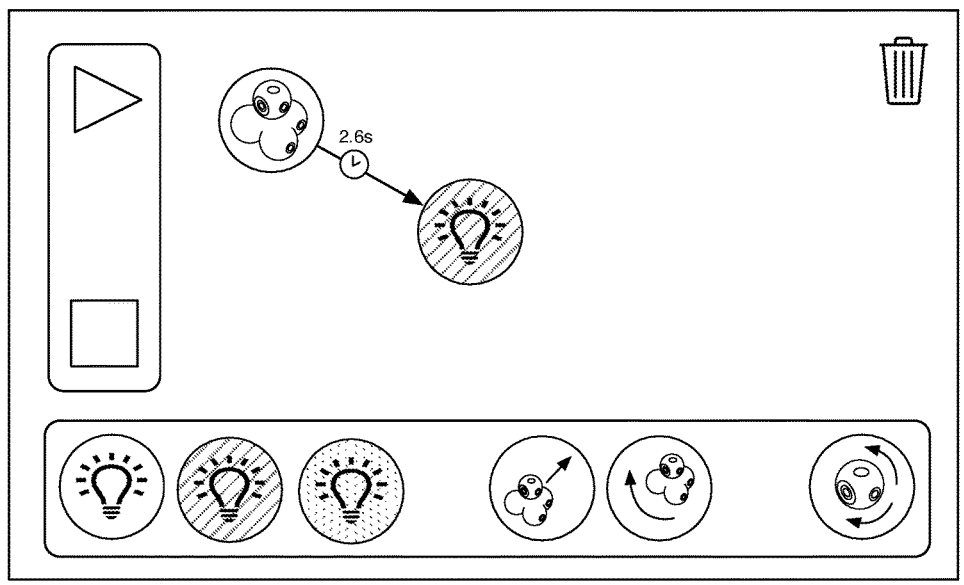
FIG. 8 is a specific example of a visual programming interface with a first state and a transition connecting the start state with the first state, wherein the event selected in FIG. 7 is associated with the transition.
Figure 9:
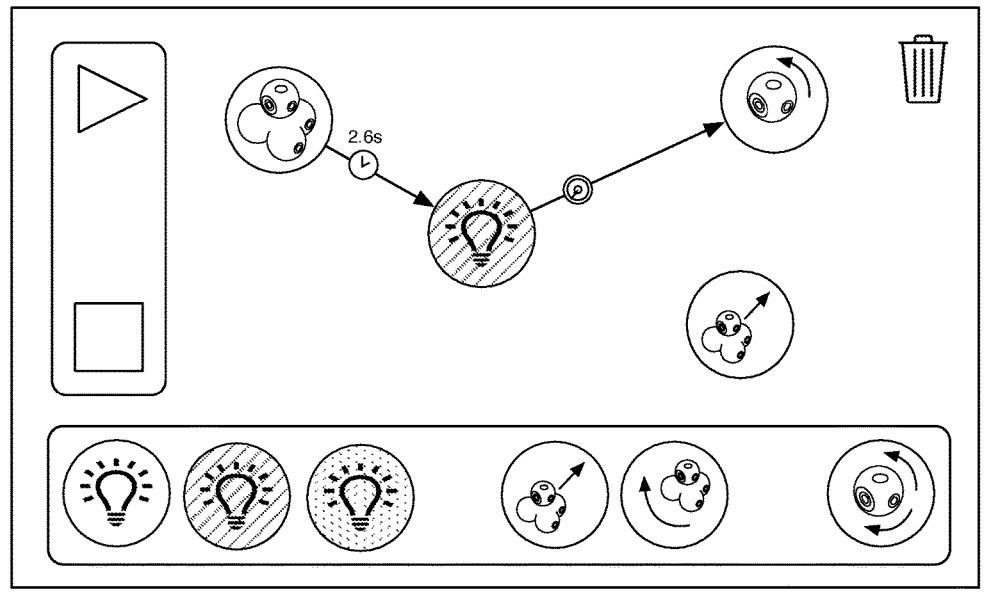
FIG. 9 is a specific example of subsequent state, transition, and event addition to the program.
Figure 10:
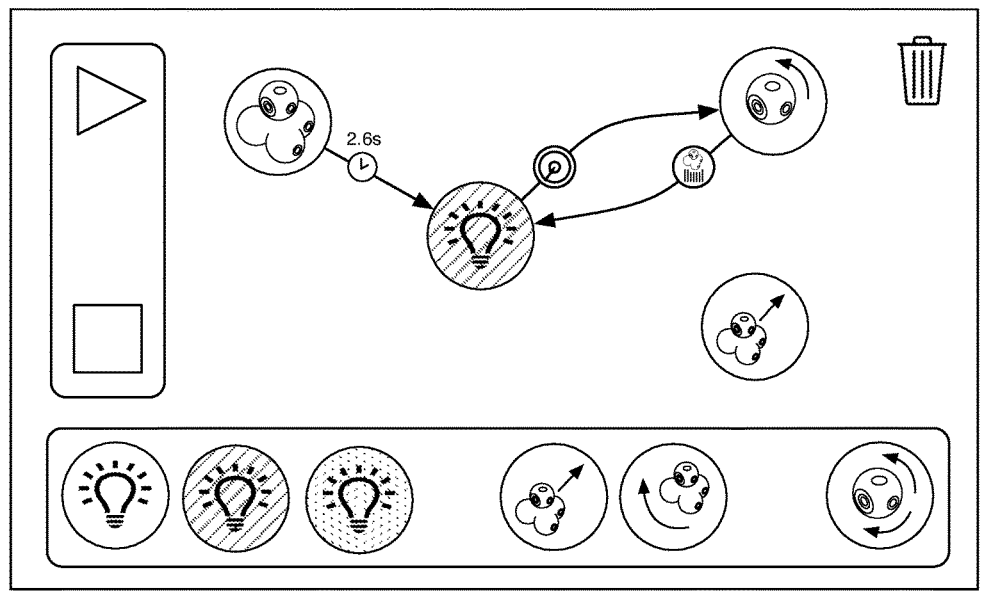
FIG. 10 is a specific example of altering the appearance properties of a first transition in response to addition of the second transition to the program.
Figure 11:
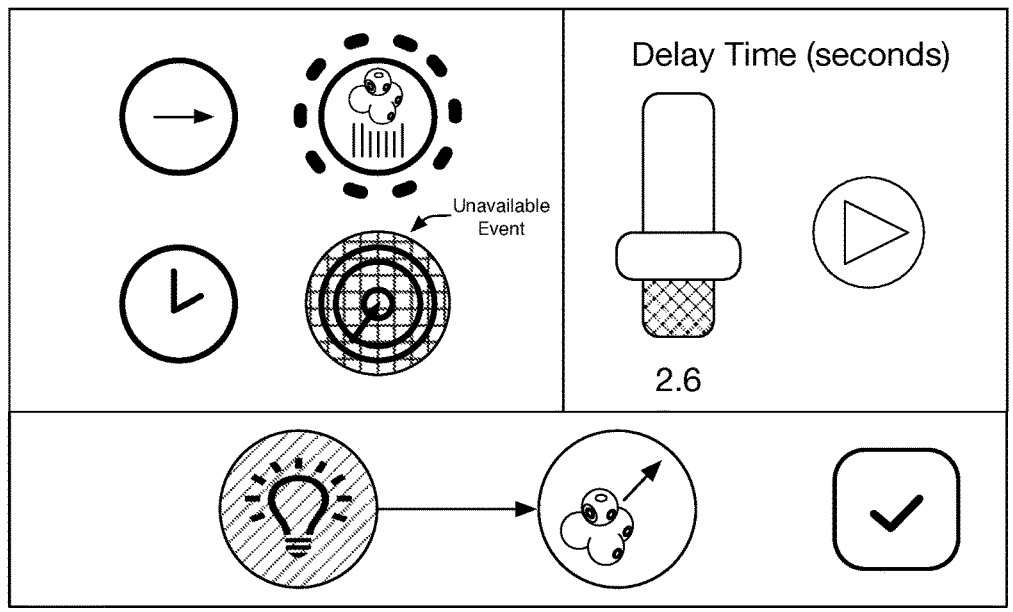
FIG. 11 is a specific example of the event option selection window with unavailable event options indicated.
Figure 12:
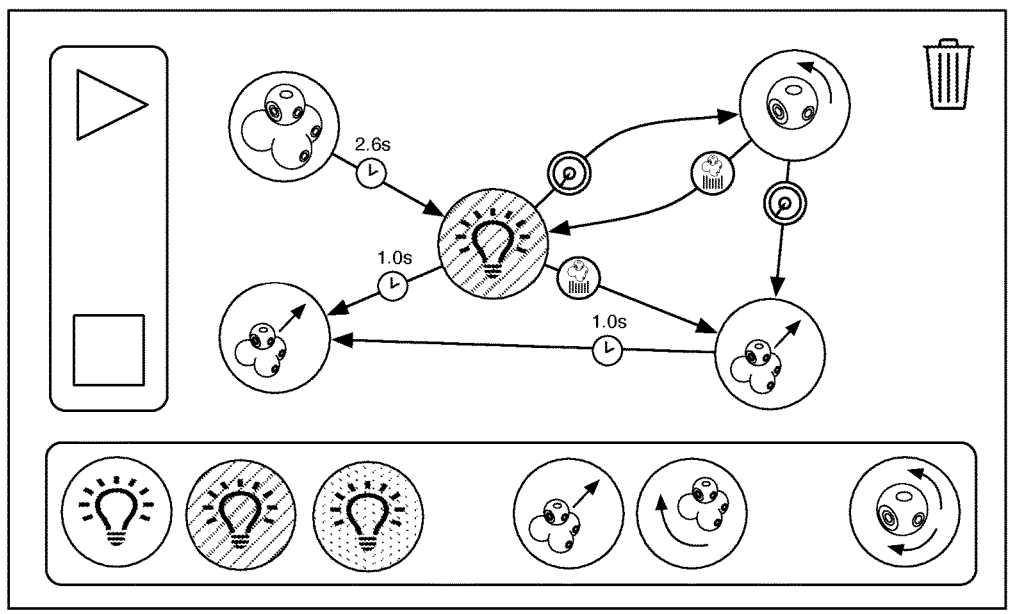
FIG. 12 is a specific example of a program written within the visual programming interface.
Figure 13:
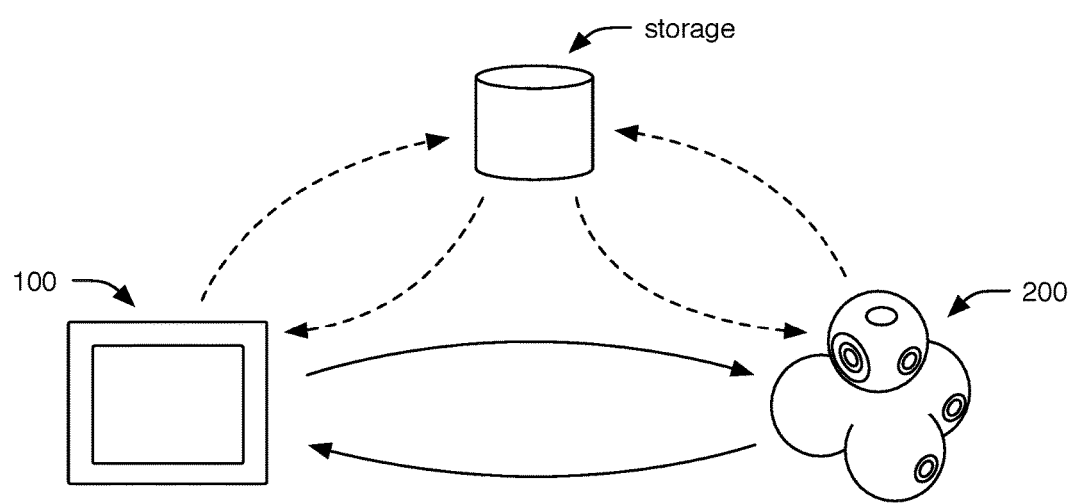
FIG. 13 is a schematic representation of a system that can implement the method.

As shown in FIGS. 1, 2, and 3, the method 1 can additionally include connecting the user device to a robot, which functions to establish a communication channel with the robot to be programmed. Connecting the user device to the robot can additionally enable robot identification, state receipt, event receipt, instruction communication, input data communication, or enable any other suitable portion of the method 1, wherein the enabled portions of the method 1 are preferably performed after the user device has been connected to the robot. Alternatively, any portion of the method 1 can be performed before (e.g., as shown in FIG. 4), after, or concurrently with robot connection to the user device. The robot can be wirelessly connected to the user device (e.g., via WiFi, Bluetooth, RF, cellular, or any other suitable wireless connection), connected to the user device via a wired connection (e.g., USB, Ethernet, FireWire, Lighting, or any other suitable wired protocol), or be otherwise connected to the user device. The robot is preferably automatically connected to the user device (e.g., wherein the user device searches for the robot upon startup, and automatically establishes a connection with the robot upon discovery), but can alternatively be manually connected to the user device (e.g., wherein a user enters the connection information or plugs the robot into the user device) or otherwise connected to the user device.

As shown in FIGS. 1, 2, and 3, the method 1 can additionally include identifying the robot, wherein the states and/or events can be received based on the robot identifier. Identifying the robot can include: obtaining an identifier that identifies the toy robot (e.g., robot identifier) or otherwise identifying the robot. Obtaining the robot identifier can include: receiving the robot identifier from the robot, determining the robot identifier based on an intermediary identifier (e.g., using an RFID tag, such as by retrieving the robot identifier associated with the RFID tag or using the RFID tag as the identifier), determining the robot identifier based on the connection type, identifying the robot from user device sensor measurements (e.g., identifying the robot from an image of the robot recorded by the user device), or otherwise determining the robot identifier.

The method 1 can additionally include determining (e.g., receiving, estimating, calculating) information about the robot, preferably based on the robot identifier but alternatively based on any other suitable information. The information can be received from a remote database, the storage of the user device, the robot (e.g., from the robot storage), or from any other suitable system. Determining information about the robot can include retrieving a set of predefined states for the robot, retrieving a set of predefined events for the robot, and/or retrieving any other suitable information for the robot. Determining information about the robot can additionally include retrieving or compiling instructions, commands, and/or machine code associated with some or all of the states and/or events.

Retrieving a set of predefined states for a robot functions to identify the robot output options available to the user for control. The states can be robot-specific, wherein the states are retrieved based on a robot identifier. The states can be specific to an individual robot, specific to a robot type, specific to a robot line, specific to a robot make, or specific to a robot type. Alternatively, the states can be generic across all robots of the same make, model, and/or version; all robots of the same make; all robots of the same type (e.g., all dolls have the same states, all trains have the same states, etc.); generic across all robots, or otherwise associated with the population of robots. In a first example, a first set of states can be retrieved for a first robot, while a second set of states, different from the first set, can be retrieved for a second robot of the same make, model, and version. In a second example, a first set of states can be retrieved for all toys of the same make and model, and a second set of states, different from the first set, can be retrieved for all toys of a second make and model. Alternatively, the robot states can be retrieved based on a user identifier (e.g., a user account associated with the user device, a user account associated with the robot, etc.), retrieved based on a user parameter (e.g., user demographic, such as age or geographic location), or be retrieved based on any other suitable information. Examples of states include light colors, light intensity, specific light control, robot component movement (e.g., forward, backward, to the side, head movement, tail movement, arm movement, individual wheel control, etc.), playing a sound, or include any other value for any other suitable output variable.

Retrieving a set of predefined events for a robot functions to identify the robot input options (e.g., sensor outputs) available to the user for use in programming. The events can be robot-specific, wherein the events are retrieved based on the robot identifier. The events can be specific to an individual robot, specific to a robot type, specific to a robot line, specific to a robot make, or specific to a robot type. Alternatively, the events can be generic across all robots of the same make, model, and/or version; all robots of the same make; all robots of the same type (e.g., all dolls have the same events, all trains have the same events, etc.); generic across all robots, or otherwise associated with the population of robots. In a first example, a first set of events can be retrieved for a first robot, while a second set of events, different from the first set, can be retrieved for a second robot of the same make, model, and version. In a second example, a first set of events can be retrieved for all toys of the same make and model, and a second set of events, different from the first set, can be retrieved for all toys of a second make and model. Alternatively, the robot events can be retrieved based on a user identifier (e.g., a user account associated with the user device, a user account associated with the robot, etc.), retrieved based on a user parameter (e.g., user demographic, such as age or geographic location), or be retrieved based on any other suitable information.

The method 1 can additionally or alternatively include: providing a programming challenge to a user on the user device, receiving a program in response to the programming challenge, determining whether the received program substantially match an answer (e.g., within a predetermined degree of error), executing the received program (e.g., executing cooperatively on the user device and robot, wherein the robot executes the states and the user device determines whether the events have occurred), and progressing to a second programming challenge in response to received program execution. However, the method 1 can progress to the second programming challenge in response to the received program substantially matching the answer, or progress to the second programming challenge in response to any other suitable condition being met. Additionally, the method 1 can include providing feedback to the user. Feedback can include feedback for a received program that does not substantially match the answer such as highlighting an error on the stage (e.g., an incorrect transition, event, state, or user-adjustable parameter value), sending an instruction to the robot to perform an error action (e.g., executing the program up to the point of the error, then stopping program execution and performing the error action), or any other suitable feedback for the received program. Feedback can also or alternatively include providing hints (e.g., hints regarding a next state, transition, or event to select). Hints can be provided after a preset time without user interaction or without user addition or a state, transition, or event; in response to receipt of a hint request; or at any other suitable time. Hints can include highlighting an icon on the user device, animating a representation of a finger making a drag-and-drop selection, playing an audio file, sending an instruction to the robot to perform an action (e.g., a preview action), or any other suitable hint.

The method 1 can additionally or alternatively include sending the program, including the states and the events, to the robot, wherein the robot can store the program as a personality. In this variation, the method 1 can additionally include the robot executing all or parts of the personality in response to the events being met, wherein the robot determines whether the events are met based on the robot sensor measurements. In this variation, non-personality programs can be cooperatively executed by the robot and user device (e.g., wherein the robot executes the states and the user device determines whether events have occurred), while personality programs can be entirely executed by the robot. However, the personality and non-personality programs can be otherwise executed. The robot can additionally send the personality program to a connected user device, receive personality updates, changes, or new personalities from the connected user device, or otherwise communicate and adjust the personality program.

An alternative embodiment preferably implements the above methods in a computer-readable medium storing computer-readable instructions. The instructions are preferably executed by computer-executable components preferably integrated with a robot control system. The robot control system can include a visual programming system configured to facilitate program writing, a programming state-to-instruction conversion system configured to convert the program to instructions, and a robot data processing system configured to determine whether connecting events have been satisfied based on sensor data received from the robot. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method for programmatically controlling a toy robot, comprising:
   displaying a set of icons at a user device remote from the toy robot;
   at the user device, receiving, from a user, a selection of a first icon from the set of icons via a drag-and-drop selection method, wherein the first icon comprises an illustration of the toy robot operating in a first state;
   at the user device, receiving, from the user, a selection of a second icon from the set of icons via the drag-and-drop selection method, wherein the second icon comprises an illustration of the toy robot operating in a second state;
   associating, by a processor, a transition with the first state and the second state, the transition directed from the first state to the second state;
   at the user device, receiving, from the user, a selection of an event icon; and in response to receiving the selection of the event icon, associating, by the processor, an event with the transition, wherein the event icon comprises an illustration of the toy robot undergoing the event wherein the toy robot is controlled based on the first state, the second state, and the event.

2. The method of claim 1, further comprising, in response to receiving the selection of the first icon, receiving the selection of the second icon, and associating the transition with the first state and the second state: displaying a representation of the first state connected to a representation of the second state by a representation of the transition.

3. The method of claim 2, wherein the representation of the transition is visually associated with a representation of the event.

4. The method of claim 3, wherein the representation of the first state comprises the first icon, the representation of the second state comprises the second icon, and the representation of the event comprises the event icon.

5. The method of claim 2, wherein the representation of the first state comprises text descriptive of the first state and the representation of the second state comprises text descriptive of the second state.

6. The method of claim 5, wherein the first state comprises a sequence of programmatic elements, wherein the text descriptive of the first state comprises text descriptive of the sequence of programmatic elements.

7. The method of claim 1, further comprising, at the user device:
in response to receiving the selection of the second icon, displaying a control input for selecting a parameter value;
receiving the parameter value at the control input; and
based on the parameter value, determining an instruction for the robot to operate in the second state.

8. The method of claim 1, wherein associating the transition with the first state and the second state is automatically performed in response to receiving the selection of the second icon.

9. The method of claim 1, further comprising:
sending an instruction from the user device to the toy robot to operate in the first state;
at the toy robot, receiving the instruction from the user device; and
at the toy robot, in response to receiving the instruction, controlling the robot to operate in the first state.

10. The method of claim 9, further comprising:
at the user device, receiving a set of sensor measurements;
determining, by the processor, that the event has occurred based on the set of sensor measurements; and
in response to determining that the event has occurred, sending a second instruction from the user device to the toy robot to operate in the second state.

11. The method of claim 10, further comprising, at the user device, substantially concurrent with sending the second instruction, displaying an indication that the robot has entered the second state.

12. The method of claim 9, wherein the instruction comprises a set of machine code blocks associated with the first state.

13. The method of claim 1, further comprising:
receiving, from the user, a selection of a third icon from the set of icons via the drag-and-drop selection method, wherein the third icon comprises an illustration of the toy robot operating in a third state;
associating, by the processor, the first state with the third state; and
associating, by the processor, the transition with the third state, the transition directed from the first state and the third state to the second state.

14. A method for programmatically controlling a toy robot, comprising:
displaying a set of state icons at the user device, wherein each state icon is associated with a respective state, wherein the respective state is one of a set of states the toy robot is capable of operating in, the state icon comprising an illustration of the toy robot operating in the respective state;
at the user device, receiving from a user, via a drag-and-drop selection method, a selection of a first state icon from the set of state icons, the first state icon associated with a first state;
associating, by a processor, a first transition with the first state, the first transition originating from the first state;
associating, by the processor, a first event with the first transition;
associating, by the processor, a second transition with the first state, the second transition originating from the first state;
displaying a set of event icons at the user device, wherein each event icon is associated with a respective event;
in response to associating the first event with the first transition and associating the second transition with the first state, precluding selection of a first event icon associated with the first event at the user device;
while precluding the selection of the first event icon, at the user device, receiving, from the user, a selection of a second event icon associated with a second event different from the first event; and
in response to receiving the selection of the second event icon, associating, by the processor, the second event with the second transition wherein the toy robot is controlled based on the first state, the first event, and the second event.

15. The method of claim 14, further comprising:
at the user device, sending an instruction to the toy robot to operate in the state; and
at the toy robot, in response to receiving the instruction, controlling a robot subsystem associated with the state to operate in the state.

16. The method of claim 15, wherein the instruction comprises a set of machine code blocks associated with the state.

17. The method of claim 14, wherein associating the first event with the first transition is automatically performed in response to associating the first transition with the state.

18. The method of claim 14, wherein receiving the selection of the state icon and receiving the selection of the event icon are performed through a touchscreen interface.

19. The method of claim 14, wherein, for each event icon of the set, the respective event is one of a set of events the toy robot is capable of undergoing, the event icon comprising an illustration of the toy robot undergoing the respective event.

20. The method of claim 14, wherein receiving the selection of the second event icon comprises receiving the selection of the second event icon via a drag-and-drop selection method.

* * * * *

UNITED STATES PATENT AND TRADEMARK OFFICE
CERTIFICATE OF CORRECTION

PATENT NO. : 10,181,268 B2
APPLICATION NO. : 15/582924
DATED : January 15, 2019
INVENTOR(S) : Gupta et al.

Page 1 of 1

It is certified that error appears in the above-identified patent and that said Letters Patent is hereby corrected as shown below:

In Claim 2, delete "state:" and insert --state,-- therefor

Signed and Sealed this
Seventh Day of January, 2020

Andrei Iancu
*Director of the United States Patent and Trademark Office*